E. JOHNSON.
FASTENING DEVICE FOR CHAINS.
APPLICATION FILED OCT. 1, 1919.
1,354,194.
Patented Sept. 28, 1920.
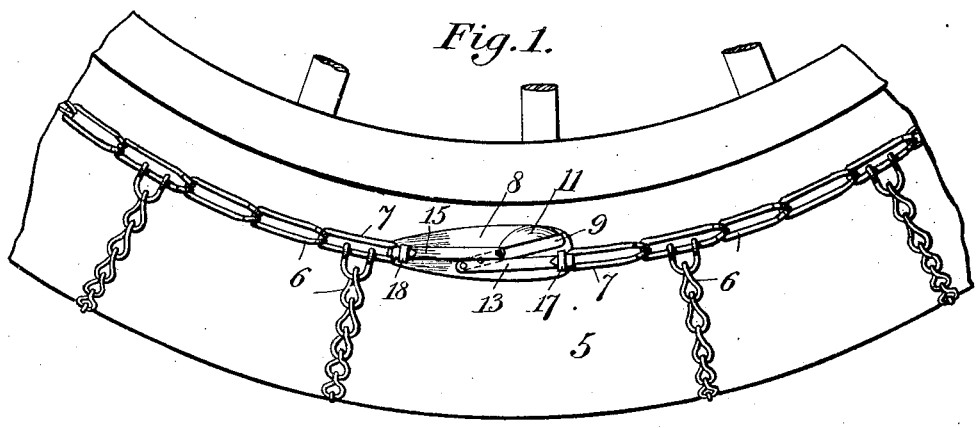
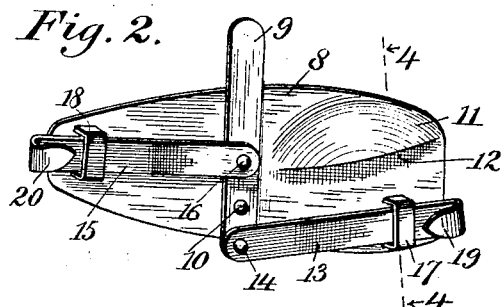
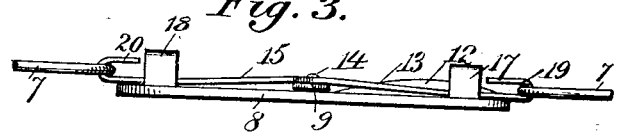
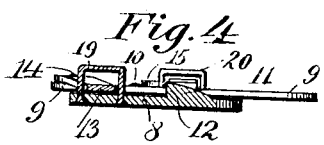
WITNESSES
Charles H. Ourand
J. P. Smith
E. Johnson
INVENTOR
BY
E. G. Siggers
ATTORNEY

UNITED STATES PATENT OFFICE.

ELMER JOHNSON, OF DODGEVILLE, WISCONSIN.

FASTENING DEVICE FOR CHAINS.

1,354,194.  Specification of Letters Patent.  Patented Sept. 28, 1920.

Application filed October 1, 1919. Serial No. 327,644.

*To all whom it may concern:*

Be it known that I, ELMER JOHNSON, a citizen of the United States, residing at Dodgeville, in the county of Iowa and State of Wisconsin, have invented a new and useful Fastening Device for Chains, of which the following is a specification.

This invention relates to tire chains, and particularly to a fastening and tightening device for such chains.

Objects of the invention are to provide a fastening device for antiskid chains which prevents loss of the chain by putting a tension upon it when in place, and which is easy to work even when one is in a hurry. Further objects are to furnish a strong yet simple fastener, and one which may be manufactured in large quantities at a low cost.

The drawing which accompanies and forms a part of this specification should be referred to in order to comprehend fully the construction, uses and advantages of the invention.

In said drawing—

Figure 1 is an elevation of a fragment of an automobile wheel showing an antiskid chain and the fastening device locked in place;

Fig. 2 is a perspective view of the invention detached, showing it partway open;

Fig. 3 is a bottom edge view of the invention as depicted in Fig. 2, but with the links of an anti-skid chain shown engaged;

Fig. 4 is a transverse section taken on the line 4—4 of Fig. 2.

The numeral 5 refers to a wheel of an automobile or motor truck, and 6 designates a conventional form of antiskid chain having spaced-apart end links 7. Removably secured to said links so as to connect them and serve as a fastener for the chain is the device which is the subject of the present invention.

The fastening and tensioning device includes an elongated flat plate 8 of any desired form and material, but preferably of ovoidal shape and made of light, strong metal. An operating lever 9 is pivoted to the plate at one side of the longitudinal axis as at 10. The lever is long enough to extend well beyond the edge of the plate, so that it may be readily grasped by the fingers, and is made of resilient metal. The lever may be swung to the left or small end of the plate without hindrance, but to the larger end of the plate at one side of the longitudinal axis of the plate there is provided a lug 11. The latter rises gradually from the plate at the outer side, and abruptly on the inner side forming there a shoulder 12. Thus when the lever is swung to the right it engages the lug and is forced around with increasing frictional resistance until the lever snaps into place below the shoulder 12, where its resiliency and the tension of the chain holds it securely in position. It will be noted that the pivot 10 of the lever and the latching lug 11 lie on opposite sides of the longitudinal axis of the plate. The shoulder 12 is disposed at an incline, so that when the lever is locked below the same, it is disposed at an angle to said longitudinal axis.

To the outer end of lever 9 an arm 13 is pivoted as at 14, while at an intermediate point on the lever is pivoted a similar arm 15 by any desirable means 16. The arms 13 and 15 are equidistant from the pivot 10 of the lever so that for any given movement of the latter, both arms are moved an equal extent. Arm 13 is passed through and guided by a loop 17 formed or secured to the plate at or near one end in any desirable way. Arm 15 is passed through a similar loop 18 formed on or secured near the other end of the plate. The two arms terminate in hooks 19, 20, formed by bending the ends of the arms backwardly. The hook ends when in locked position pass under loops 17, 18, as Fig. 1 illustrates. Preferably the device will be attached by one hook to a link 7 at all times so that only one connection need be made when applying the chain.

The invention is used in the following manner: With the chain in place on the wheel, the lever is thrown over to the left to move the hooked arms outwardly to their full extent. Then the free link of the chain is engaged by the free hook, and the lever moves to the right. The latter movement draws the end links together and hence tightens the entire chain on the wheel. When the lever is locked under the shoulder, a constant tension is put upon the chain, and at the same time the hooked ends lie within the loops, absolutely preventing the escape of the links of the chain. The end links are locked by the hooks and loops and cannot possibly work loose.

The device which has been described is strong and simple in construction, and besides securing the chain it puts the chain under some tension. It is a characteristic of antiskid chains that they work loose and are either entirely lost or some part is lost, with the result that they fly up and strike the fender, wearing the latter away and making an annoying racket. By using the present device, the chain will not work loose. When chains are being applied usually one is in a hurry because of the imminence of bad weather; the chains are generally carelessly put on and do not give good service. With the present invention, one may apply chains in a minimum of time.

While the invention has been described as intended for antiskid chains, it is obvious that it has other uses, and I do not wish to be limited to any particular use.

What is claimed is:—

1. A fastening and tensioning device for chains comprising a base plate, an operating lever pivoted to the plate, arms pivoted to the lever on either side of the lever pivot, means on the plate for latching the lever, and means on the arms engageable with links of a tire chain, and locking said links when the lever is latched.

2. A fastening and tensioning device for chains comprising a base plate, a lever pivoted to the base plate, means for latching the lever, arms pivoted to the lever at their inner ends, hooks formed on the outer ends of said arms, and loops secured to the base and guiding said arms and engaging with the hooks.

3. A fastening and tensioning device for chains comprising a base plate, a lever pivoted to the base plate, means for latching the lever, arms pivoted to the lever at their inner ends, hooks formed on the outer ends of said arms, and loops secured to the base plate and guiding said arms and engaging with the hooks, said loops receiving the ends of the hooks on the arms when the lever is latched.

4. A fastening and tensioning device for chains comprising a base plate, a hand-operated lever pivoted thereto, arms pivoted to said lever on opposite sides of its pivot, guide loops for said arms, means on the arms for connecting the ends of a chain thereto, and a longitudinally disposed shoulder provided on the plate having one side inclined, said shoulder being designed to lock the lever from movement.

5. A fastening and tensioning device for chains comprising a base plate, said plate being substantially ovoidal in shape and flat except near its larger end, a lug provided at said end, said lug rising gradually from the plate at its outer side and abruptly from the plate at its inner side to form a shoulder, said shoulder being disposed at one side of the longitudinal axis of the plate and inclining at an angle thereto, a lever pivoted to the plate at a point on the side of said longitudinal axis opposite to that of said lug, said lever being movable into engagement with said shoulder, and means operated by said lever for engaging with and tensioning a chain.

6. A fastening and tensioning device for chains comprising a base plate, said plate being substantially ovoidal in shape and flat except near its larger end, a lug provided at said end, said lug rising gradually from the plate at its outer side and abruptly from the plate at its inner side to form a shoulder, said shoulder being disposed on one side of the longitudinal axis of the plate and inclining at an angle thereto, a lever pivoted to the plate at a point on the opposite side of said longitudinal axis, said lever being movable into engagement with said shoulder and having a normal tendency to lie flat against said plate, and means connected with said lever for engaging with the end links of a chain, said lever when locked exerting a tension on said chain, and means whereby the end links are locked to the plate when the lever is locked.

In testimony that I claim the foregoing as my own, I have hereto affixed my signature in the presence of two witnesses.

ELMER JOHNSON.

Witnesses:
JAMES E. O'NEILL,
M. A. DAVIES.